United States Patent
Yoshida et al.

(10) Patent No.: US 12,352,008 B2
(45) Date of Patent: Jul. 8, 2025

(54) WORKING MACHINE

(71) Applicant: KUBOTA CORPORATION, Osaka (JP)

(72) Inventors: Daisuke Yoshida, Osaka (JP); Yoshinori Torii, Osaka (JP); Daisuke Domen, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 388 days.

(21) Appl. No.: 17/986,464

(22) Filed: Nov. 14, 2022

(65) Prior Publication Data
US 2023/0072461 A1 Mar. 9, 2023

Related U.S. Application Data

(63) Continuation of application No. PCT/JP2021/018900, filed on May 19, 2021.

(30) Foreign Application Priority Data

May 21, 2020 (JP) .................................. 2020-088990

(51) Int. Cl.
| | |
|---|---|
| *B60N 3/02* | (2006.01) |
| *B60R 3/00* | (2006.01) |
| *B62D 33/06* | (2006.01) |
| *E02F 9/08* | (2006.01) |
| *E02F 9/16* | (2006.01) |

(52) U.S. Cl.
CPC .................. *E02F 9/16* (2013.01); *B60N 3/02* (2013.01); *B60R 3/005* (2013.01); *E02F 9/0833* (2013.01); *E02F 9/0891* (2013.01); *B62D 33/06* (2013.01)

(58) Field of Classification Search
CPC ......... E02F 9/16; E02F 9/0833; E02F 9/0891; B60N 3/02; B60R 3/005; B62D 33/06; B62D 33/063; B62D 33/067
See application file for complete search history.

(56) References Cited

U.S. PATENT DOCUMENTS

| | | | | |
|---|---|---|---|---|
| 6,068,277 A | * | 5/2000 | Magnussen | B60R 3/02 182/127 |
| 12,180,681 B2 | * | 12/2024 | Okazaki | E02F 9/0875 |

(Continued)

FOREIGN PATENT DOCUMENTS

| | | |
|---|---|---|
| JP | 2010-024715 A | 2/2010 |
| JP | 2010-084329 A | 4/2010 |

(Continued)

OTHER PUBLICATIONS

Supplementary European Search Report issued in family msmber European Patent Office (EPO) Patent Application No. 21 80 9245.0, dated May 16, 2024.

(Continued)

*Primary Examiner* — Gregory A Blankenship
(74) *Attorney, Agent, or Firm* — Greenblum & Bernstein, P.L.C.

(57) ABSTRACT

A working machine includes a machine body, an operator's seat mounted on the machine body, an exterior cover positioned on a side of the operator's seat, and a handrail positioned with the exterior cover on the same side of the operator's seat and attached to the machine body. The exterior cover is fixed to a fixing unit included in the handrail.

8 Claims, 14 Drawing Sheets

(56) References Cited

U.S. PATENT DOCUMENTS

| | | | |
|---|---|---|---|
| 2004/0188166 A1* | 9/2004 | Sugiyama | ............... E02F 9/18 180/291 |
| 2018/0297641 A1 | 10/2018 | Nada et al. | |
| 2020/0299927 A1* | 9/2020 | Koyama | ............. B60K 15/063 |
| 2023/0072461 A1* | 3/2023 | Yoshida | ............... E02F 9/0891 |

FOREIGN PATENT DOCUMENTS

| | | | |
|---|---|---|---|
| JP | 2013-064323 A | 4/2013 |
| JP | 2015-140636 A | 8/2015 |
| JP | 2018-177058 A | 11/2018 |

OTHER PUBLICATIONS

International Search Report and Written Opinion of the International Searching Authority issued in International Patent Application No. PCT/JP2021/018900, dated Aug. 17, 2021, along with an English translation thereof.

International Preliminary Report on Patentability issued in International Patent Application No. PCT/JP2021/018900, dated Nov. 17, 2022.

* cited by examiner

WORKING MACHINE

CROSS REFERENCE TO RELATED APPLICATIONS

This application is a continuation application of International Application No. PCT/JP2021/018900, filed on May 19, 2021, which claims the benefit of priority to Japanese Patent Application No. 2020-088990, filed on May 21, 2020. The entire contents of each of these applications are hereby incorporated herein by reference.

BACKGROUND OF THE INVENTION

1. Field of the Invention

The present invention relates to a working machine.

2. Description of the Related Art

In the related art, a working machine disclosed in Japanese Unexamined Patent Application Publication No. 2010-84329 is known.

In the working machine disclosed in Japanese Unexamined Patent Application Publication No. 2010-84329, a handrail and an exterior cover are arranged on the side of an operator's seat mounted on a machine body. The handrail and the exterior cover are assembled separately to the machine body.

SUMMARY OF THE INVENTION

In the working machine disclosed in Japanese Unexamined Patent Application Publication No. 2010-84329, since the exterior cover is assembled to the machine body, the position at which the exterior cover can be fixed in place is limited by the machine body, and it may sometimes be difficult to securely fix the exterior cover in place.

Preferred embodiments of the present invention provide working machines each of which includes an exterior cover can be securely fixed in place.

A working machine according to an aspect of the present invention includes a machine body, an operator's seat mounted on the machine body, an exterior cover positioned on a side of the operator's seat, and a handrail positioned with the exterior cover on the same side of the operator's seat and attached to the machine body. The exterior cover is fixed to a fixing unit included in the handrail.

A passage to be used by an operator who gets on and off the operator's seat may be formed in front of the handrail and the exterior cover. The handrail may be located at a position at which the operator can grasp the handrail when the operator gets on and off.

The exterior cover may be fixed to the handrail and may not be fixed to the machine body.

The handrail may include a first pole portion that extends above the exterior cover in a direction from the front of the exterior cover toward the rear of the exterior cover and a second pole portion that is positioned in front of the exterior cover and that extends downward from a front portion of the first pole portion. The fixing unit may include a plurality of fixing portions provided on the first pole portion and on the second pole portion to support an upper portion of the exterior cover and a front portion of the exterior cover.

The working machine may further include a hood to cover a prime mover mounted on a rear portion of the machine body, a support frame erected on the machine body to support the hood, and a floor step defining a floor surface of the machine body. A rear portion of the first pole portion may be attached to the support frame. A lower portion of the second pole portion may be attached to the floor step.

The plurality of fixing portions may include a first fixing portion on an intermediate portion of the first pole portion, a second fixing portion on a rear portion of the first pole portion, a third fixing portion on an intermediate portion of the second pole portion, and a fourth fixing portion on a lower portion of the second pole portion. The first fixing portion and the second fixing portion may support the upper portion of the exterior cover. The third fixing portion and the fourth fixing portion may support the front portion of the exterior cover.

The exterior cover may include a cover main body including a main portion and an extended portion that extends rearward from an upper portion of the main portion and an opening and closing cover that covers a notch opening, which is formed in the cover main body at a position behind the main portion and below the extended portion, such that the notch opening can be opened and closed. The fixing unit may fix an upper portion of the cover main body in place above the notch opening and may fix a front portion of the cover main body in place in front of the notch opening.

The cover main body may be formed of a hollow member made of a resin and detachably fixed to the fixing unit with a fixing member.

The cover main body may be formed of a sheet metal member and fixed to the fixing unit by welding.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
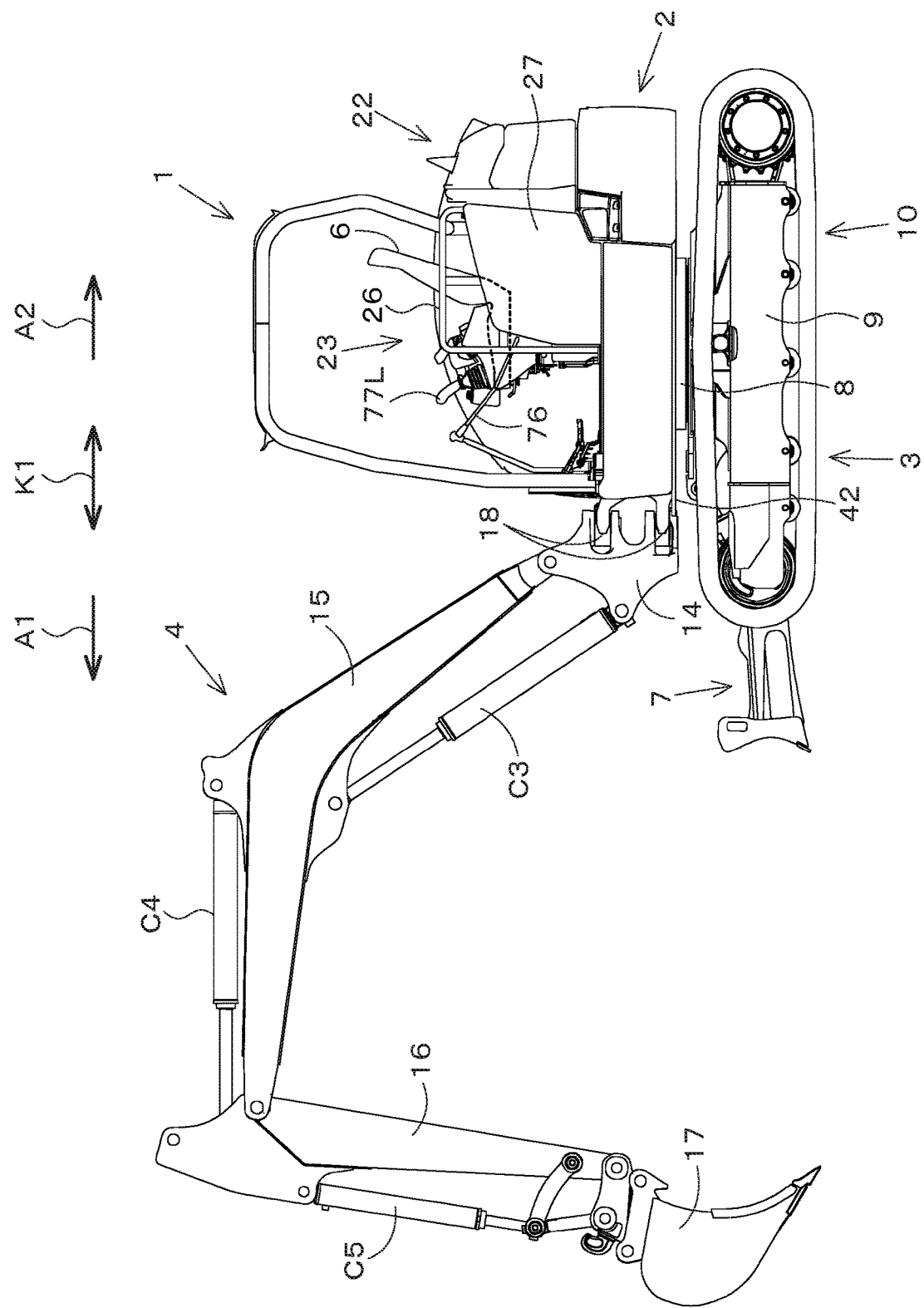
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described below with reference to the drawings as necessary.

FIG. 1 is a schematic side view illustrating the overall configuration of a working machine 1 according to the present embodiment. In the present embodiment, a backhoe, which is a slewable working machine, is described as an example of the working machine 1.

As illustrated in FIG. 1, the working machine 1 includes a machine body (a slewing base) 2, a traveling device 3, and a working device 4. An operator's seat 6 at which an operator (a driver) sits is mounted on the machine body 2.

In the description of the present embodiment, a direction toward the front of an operator sitting at the operator's seat 6 of the working machine 1 (the direction of arrow A1 in FIG. 1) will be defined as forward, and a direction toward the rear of the operator (the direction of arrow A2 in FIG. 1) will be defined as backward. In FIG. 1, the longitudinal direction is denoted by the reference sign K1. In addition, a direction toward the left of the operator (the near side in FIG. 1) will be defined as leftward, and a direction toward the right of the operator (the far side in FIG. 1) will be defined as rightward.

In the following description, the horizontal direction, which is a direction perpendicular to the longitudinal direction K1, will be referred to as a machine-body width direction. A direction from the center of the machine body 2 in a width direction of the machine body 2 (the machine-body width direction) toward a right portion or a left portion of the machine body 2 will be defined as a direction toward the outside of the machine body 2. In other words, the phrase "toward the outside of the machine body 2" refers to a direction that is away from the widthwise center of the machine body 2 and that is parallel to the machine-body width direction. In addition, in the following description, a direction that is opposite to the direction toward the outside of the machine body 2 will be defined as a direction toward the inside of the machine body 2. In other words, the phrase "toward the inside of the machine body 2" refers to a direction that is toward the widthwise center of the machine body 2 and that is parallel to the machine-body width direction.

As illustrated in FIG. 1, the traveling device 3 includes a traveling frame 9 and traveling mechanisms 10 that are arranged at left and right portions of the traveling frame 9. The traveling mechanisms 10 are each formed of a crawler-type traveling mechanism that is driven by a hydraulic motor. A dozer device 7 that can be raised and lowered by a hydraulic cylinder is mounted on a front portion of the traveling device 3.

As illustrated in FIG. 1, the working device 4 is provided at the front of the machine body 2 and includes a boom 15, an arm 16, and a bucket (a working tool) 17. A base portion of the boom 15 is attached to a swing bracket 14 in such a manner as to be freely pivotable around a horizontal axis (an axis extending in the machine-body width direction K2), that is, in such a manner as to be freely swingable in the vertical direction. The swing bracket 14 is supported by a support bracket 18, which is provided at the front of the machine body 2, so as to be pivotable around a vertical axis (an axis extending in the vertical direction). The arm 16 is attached to an end of the boom 15 so as to be freely pivotable around the horizontal axis (freely swingable in the horizontal direction or the vertical direction). The bucket 17 is attached to an end of the arm 16 so as to be capable of performing a shoveling operation and a dumping operation. Instead of or in addition to the bucket 17, another working tool (a hydraulic attachment) that can be driven by a hydraulic actuator can be mounted on the working machine 1. Examples of the other working tool include a hydraulic breaker, a hydraulic crusher, an angle broom, an earth auger, a pallet fork, a sweeper, a mower, and a snow blower.

The swing bracket 14 swings in response to expansion and contraction of a hydraulic cylinder. The boom 15 swings in response to expansion and contraction of a boom cylinder C3. The arm 16 swings in response to expansion and contraction of an arm cylinder C4. The bucket 17 performs the shoveling operation and the dumping operation in response to expansion and contraction of a bucket cylinder (a working tool cylinder) C5. The boom cylinder C3, the arm cylinder C4, and the bucket cylinder C5 are each formed of a hydraulic cylinder (a hydraulic actuator).

As illustrated in FIG. 1, the machine body 2 is supported on the traveling frame 9 (traveling device 3) with a slewing bearing 8 interposed therebetween such that the machine body 2 is rotatable around a vertical axis (capable of turning left and right).

Figure 3:
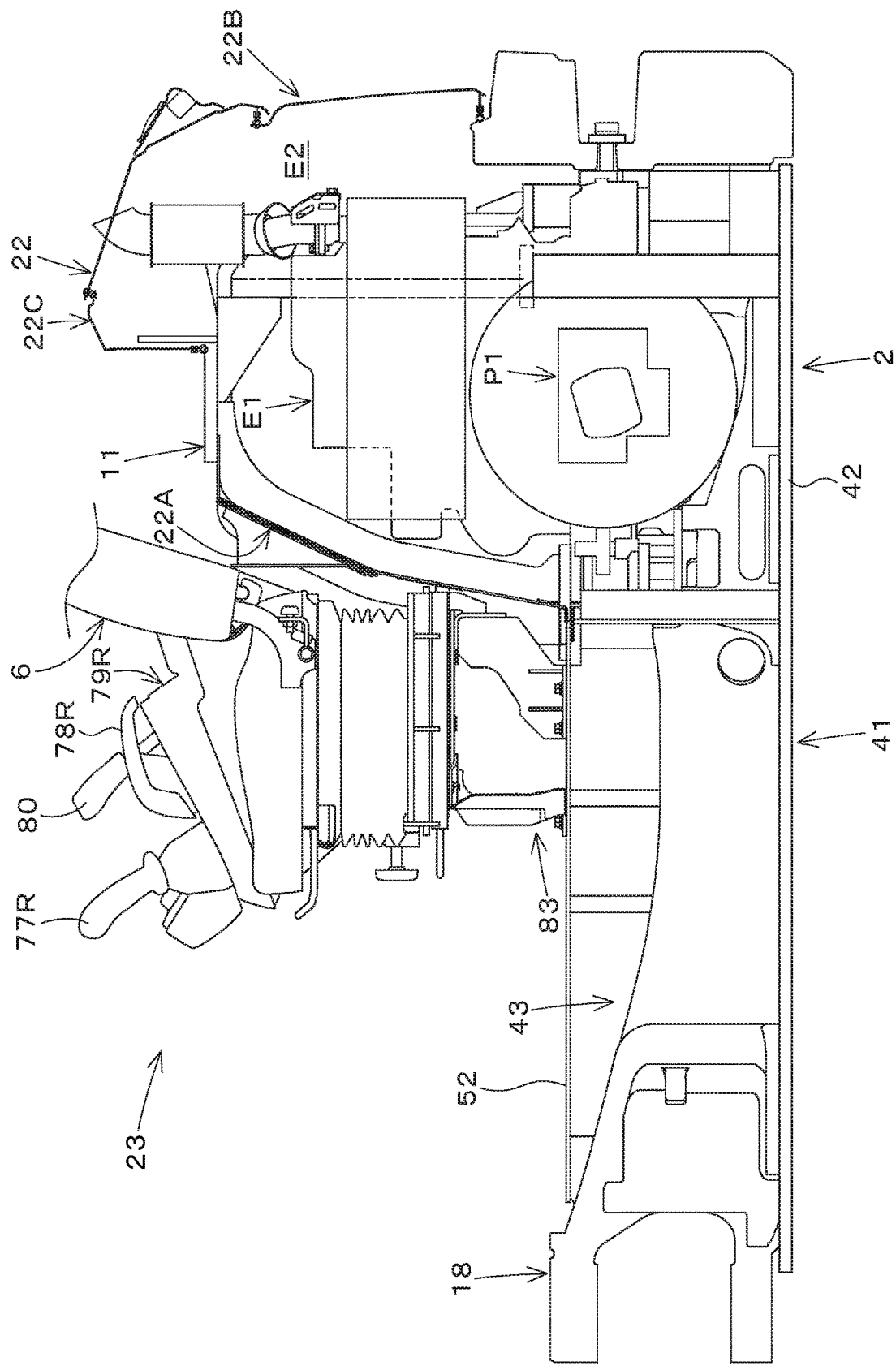
FIG. 3 is a side view illustrating a state where the operation unit and a prime mover are assembled to a machine body.

As illustrated in FIG. 3, the machine body 2 includes a slewing frame 41 serving as a framework. The slewing frame 41 is formed by fixing a reinforcing rib 43, the support bracket 18, brackets, stays, and the like to a slewing board 42 forming a bottom portion of the machine body 2. The brackets, the stays, and the like are used for attaching equipment (including tanks) that are mounted on the machine body 2, other components, and so forth.

As illustrated in FIG. 1 and FIG. 3, an operation unit 23 including the operator's seat 6 is mounted on the machine body 2. The operation unit 23 is disposed on one side (the left-hand side) with respect to the center of the machine body 2. As illustrated in FIG. 3, a floor step 52 that forms a floor surface of the machine body 2 (a floor surface of an upper portion of the machine body 2) is provided at the front of the machine body 2. A left front portion of the slewing frame 41 is covered with the floor step 52. The operation unit 23 is mounted on a rear portion of the floor step 52.

As illustrated in FIG. 3, a hood 22 that forms a prime mover chamber E2 is provided behind the operation unit 23, and a prime mover E1 that is mounted on a rear portion of the machine body 2 is accommodated in the prime mover chamber E2. The prime mover E1 is, for example, a diesel engine and drives a hydraulic pump P1 that delivers a hydraulic fluid (a pressure oil) used for driving a hydraulic actuator, such as a hydraulic motor or a hydraulic cylinder, included in the working machine 1. Note that the prime mover E1 may be a gasoline engine or an electric motor or may be a hybrid prime mover that includes an engine and an electric motor.

The hood 22 includes a partition wall member (a partition wall plate) 22A, a hood rear portion 22B, and a stationary hood 22C. The partition wall member 22A covers the front of the prime mover E1 (the front of an upper portion of the prime mover E1). The hood rear portion 22B is openable and closable and covers the upper portion and a rear portion of the prime mover E1. The stationary hood 22C is positioned at the front of an upper portion of the hood rear portion 22B. In the hood 22, a support frame 11 is provided so as to support the hood 22. The support frame 11 is vertically disposed on the machine body 2 (the slewing frame 41). The partition wall member 22A isolates the prime mover chamber E2 from the region in front of an upper portion of the prime mover chamber E2. The operator's seat 6 is located in the front of the partition wall member 22A. In other words, the partition wall member 22A is a member that isolates the prime mover chamber E2 from the region in which the operator's seat 6 is disposed (a region that is closer to the operator's seat 6 than to the prime mover chamber E2).

Figure 2:
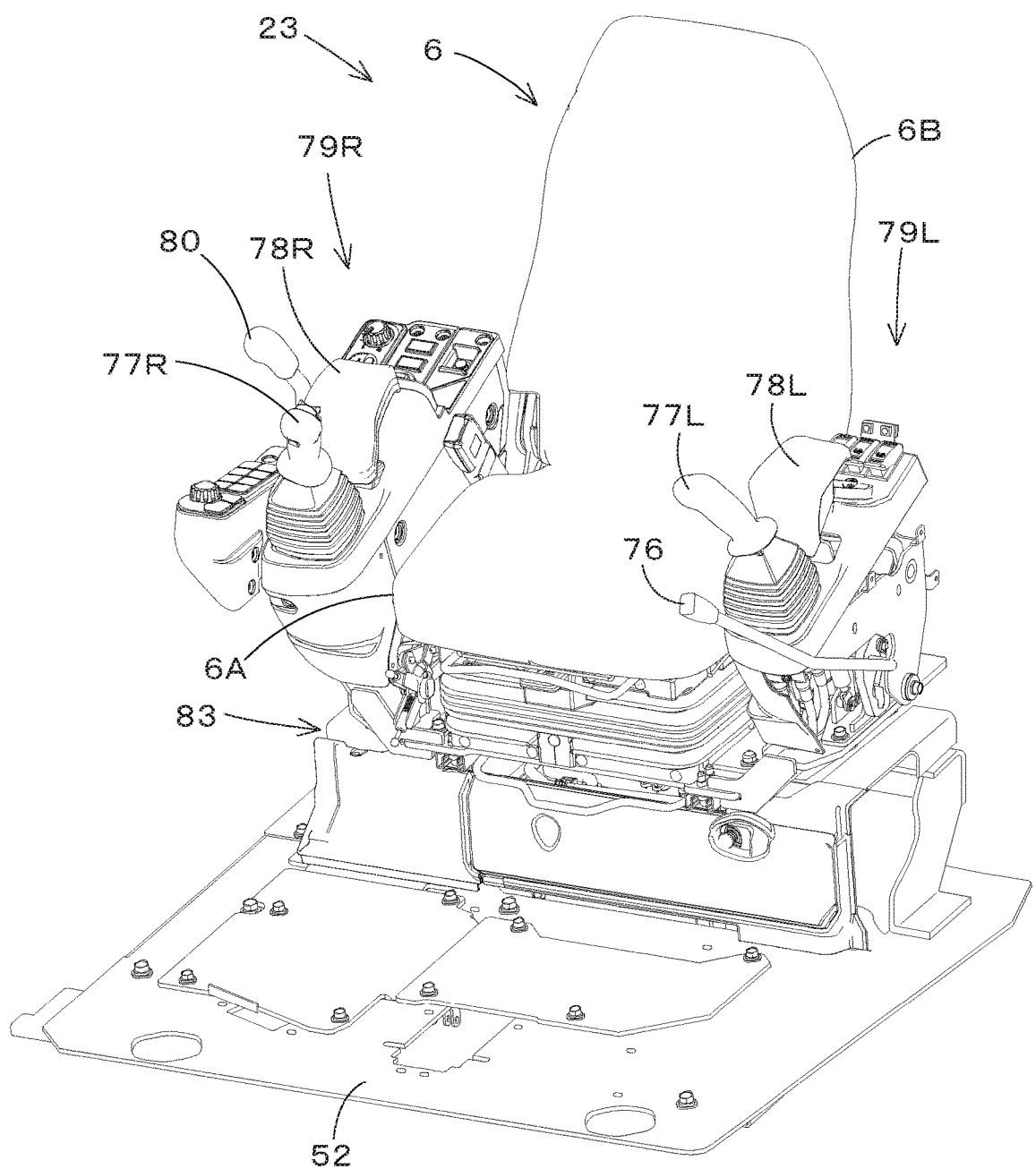
FIG. 2 is a perspective view of an operation unit.

As illustrated in FIG. 2, the operation unit 23 includes a left console (a first console) 79L that is positioned on one side (the left-hand side) of the operator's seat 6 and a right console (a second console) 79R that is positioned on the other side (the right-hand side) of the operator's seat 6. The first console 79L includes an unload lever 76, a left control lever (a first operating member) 77L, a left armrest 78L, and so forth. The second console 79R includes a right control lever (a second operating member) 77R, a right armrest 78R, and a dozer lever (a lever member) 80. The operator's seat 6 includes a seat 6A that supports an operator's buttocks and a backrest 6B that supports the operator's back.

The unload lever 76 is a lever that switches between a state where supply of a hydraulic fluid to hydraulic equipment (e.g., a hydraulic cylinder that drives the working device 4, a slewing motor that turns the machine body 2) is allowed and a state where the hydraulic fluid cannot be supplied to the hydraulic equipment.

The control lever 77L can control two control targets, and for example, the control lever 77L can control a turning operation of the machine body 2 and a swing operation of the arm 16. Similarly, the control lever 77R can control two control targets, and for example, the control lever 77R can control a swing operation of the boom 15 and a swing operation of the bucket 17.

The dozer lever 80 is a lever that controls the dozer device 7.

As illustrated in FIG. 1, a handrail 26 and an exterior cover 27 are arranged on one side (the left-hand side) of the operation unit 23.

Figure 4:
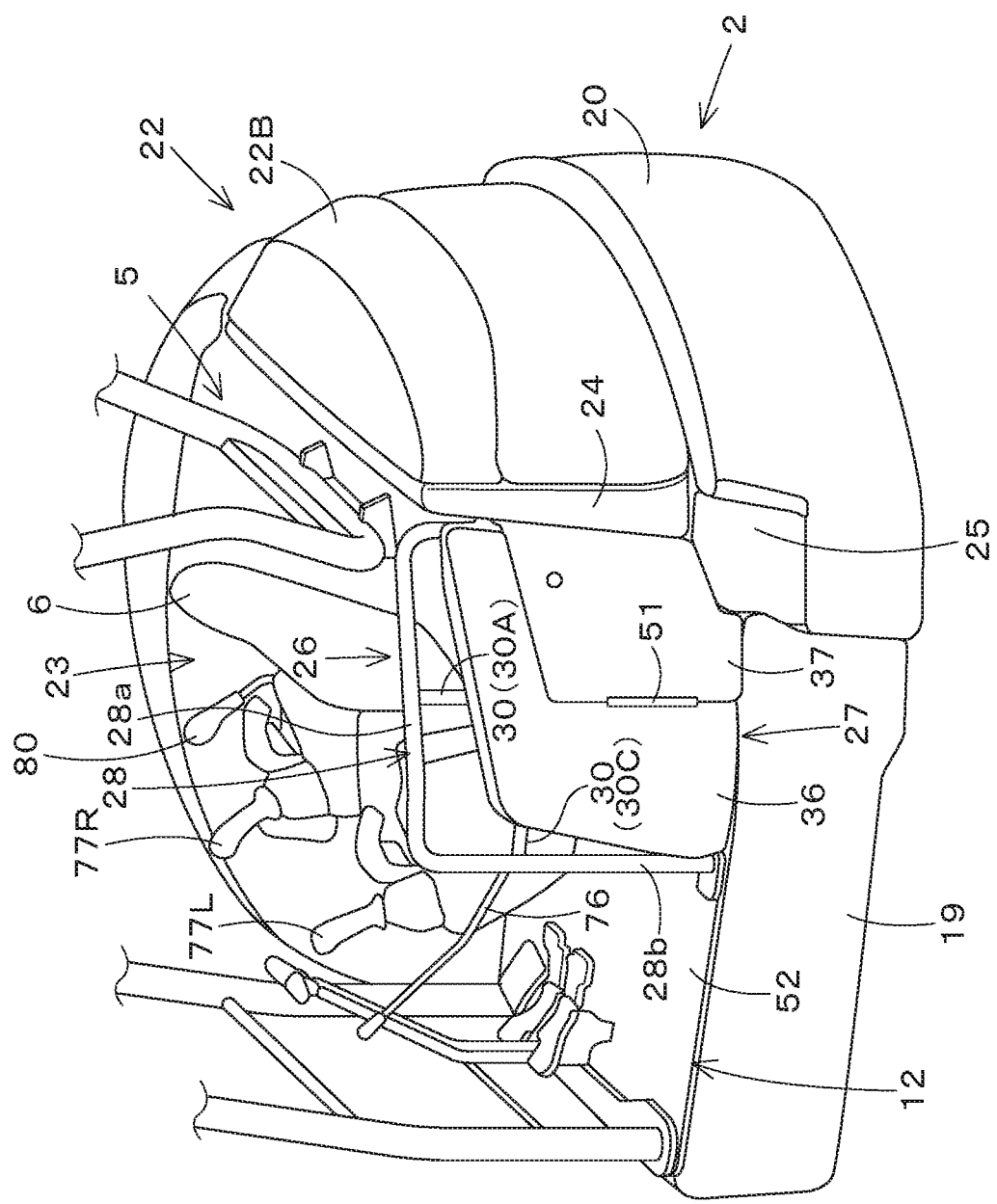
FIG. 4 is a rear perspective view of the working machine when viewed from the left-hand side.

As illustrated in FIG. 4, the handrail 26 and the exterior cover 27 are arranged on the same side of the operator's seat 6. The handrail 26 is attached to the machine body 2, and the exterior cover 27 is detachably attached to the handrail 26. In addition, the exterior cover 27 is attached to the machine body 2 with the handrail 26 interposed therebetween. In other words, the exterior cover 27 is not directly fixed to the machine body 2 (is not fixed to the machine body 2 by a member other than the handrail 26).

The exterior cover 27 is located at a position in front of a left-side portion of a closing member 24, which is disposed at the front of the hood rear portion 22B, and above a slewing cover 19, which covers the left-side surface of the slewing frame 41. A closing member 25 that is made of rubber is disposed between the exterior cover 27 and a weight 20 that forms a rear portion of the machine body 2. Each of the closing members 24 and 25 is a member that closes a gap between members. The exterior cover 27 covers a side of a lower rear portion of the operation unit 23 and a side of a refueling unit 48, which will be described later (see FIG. 11). A passage 12 that is used by an operator who gets on and off the operator's seat 6 is formed in front of the exterior cover 27 and the handrail 26. The handrail 26 is provided at a position where an operator can grasp it when the operator gets on and off.

As illustrated in FIG. 5 to FIG. 8, the handrail 26 includes a handrail main body 28 that is formed of a bar-shaped member such as a pipe member. The handrail main body 28 includes a first pole portion 28a, a second pole portion 28b, and a third pole portion 28c.

Figure 5:
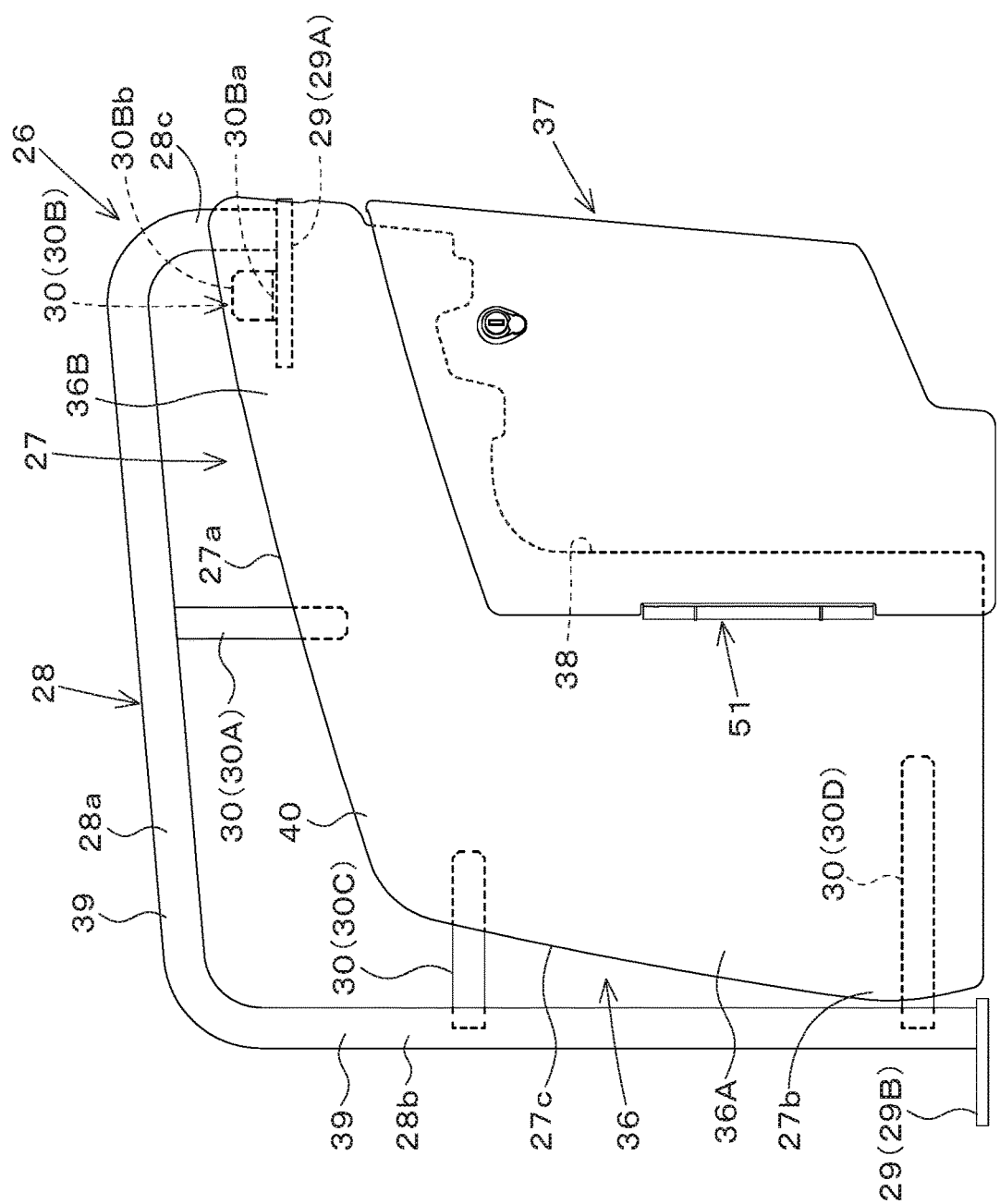
FIG. 5 is a left-hand side view of a handrail and an exterior cover.
Figure 7:
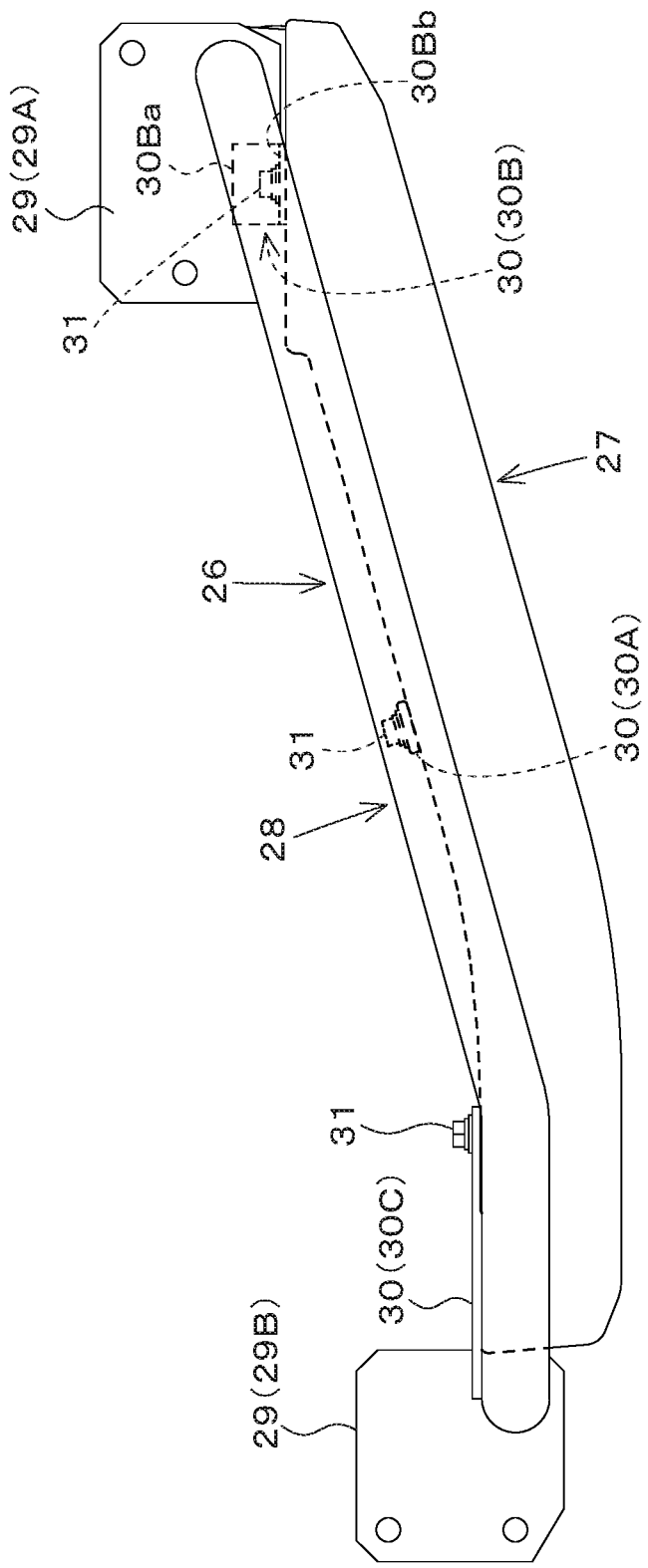
FIG. 7 is a plan view of the handrail and the exterior cover.

The first pole portion 28a is positioned above the exterior cover 27, and as illustrated in FIG. 7, the first pole portion 28a is formed so as to extend along the exterior cover 27 and overlaps the exterior cover 27 when viewed in plan view. In addition, as illustrated in FIG. 5, the first pole portion 28a extends above the exterior cover 27 in a direction from the front of the exterior cover 27 toward the rear of the exterior cover 27. More specifically, as illustrated in FIG. 7, a front portion of the first pole portion 28a substantially linearly extends rearward, and an intermediate portion and a rear portion of the first pole portion 28a extend in an inclined direction toward the inside of the machine body 2 in such a manner that the rear portion is positioned further toward the inside of the machine body than the intermediate portion is.

As illustrated in FIG. 5, the second pole portion 28b is positioned in front of the exterior cover 27 and extends downward from the front portion of the first pole portion 28a. More specifically, the second pole portion 28b extends from a front end portion of the first pole portion 28a downward in the vertical direction so as to reach a lower end portion of the exterior cover 27.

As illustrated in FIG. 5, the third pole portion 28c extends downward from the rear portion of the first pole portion 28a. A lower portion of the third pole portion 28c is located on the right-hand side of an upper rear portion of the exterior cover 27.

Figure 9:
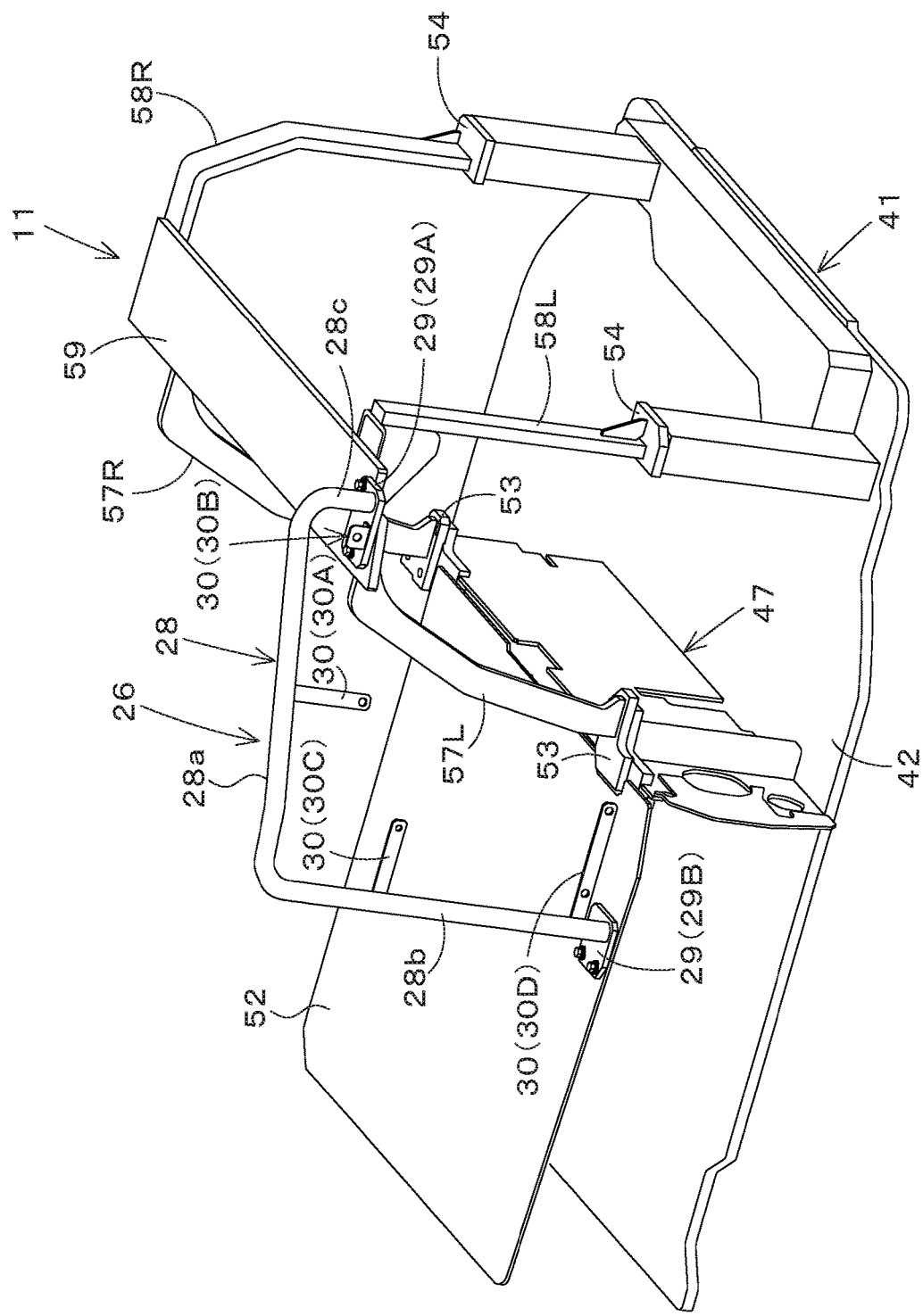
FIG. 9 is a perspective view illustrating a mounting structure of the handrail.

As illustrated in FIG. 9, the handrail 26 includes a plurality of attachment plates 29 that are used for attaching the handrail main body 28 to the machine body 2. The plurality of attachment plates 29 include a first attachment plate 29A and a second attachment plate 29B. The first attachment plate 29A is positioned at a rear portion of the handrail main body 28 in such a manner that a plate surface of the first attachment plate 29A is oriented in the vertical direction, and the first attachment plate 29A is fixed to the lower portion of the third pole portion 28c. More specifically, a left rear portion of the first attachment plate 29A is fixed to the lower end of the third pole portion 28c by welding. The first attachment plate 29A is attached to the support frame 11. Thus, the rear portion of the first pole portion 28a is attached to the support frame 11 with the third pole portion 28c and the first attachment plate 29A interposed therebetween.

As illustrated in FIG. 9, the support frame 11 includes a plurality of legs (a first front leg 57L, a second front leg 57R, a first rear leg 58L, and a second rear leg 58R) that are each vertically disposed on the machine body 2 (the slewing frame 41) and an upper plate 59. The first attachment plate 29A is fixed to a left portion of the upper plate 59 with bolts. The first front leg 57L and the second front leg 57R are arranged in front of the prime mover E1 in such a manner as to be spaced apart from each other in the machine-body width direction. The first front leg 57L and the second front leg 57R are attached to attachment members 53 that are fixed to a partition plate 47 isolating a lower portion of the prime mover E1 from the region in front of the lower portion of the prime mover E1. The partition plate 47 is disposed below the partition wall member 22A (see FIG. 11) and fixed to the slewing board 42. The first front rear leg 58L and the second rear leg 58R are arranged behind the prime mover E1 in such a manner as to be spaced apart from each other in the machine-body width direction. The first front rear leg 58L and the second rear leg 58R are attached to attachment members 54 that are arranged on the slewing board 42. The upper plate 59 is formed of a plate member that is long in the machine-body width direction, and its plate surface is oriented in the vertical direction. The upper plate 59 is fixed to an upper portion of the first front leg 57L, an upper portion of the second front leg 57R, an upper portion of the first front rear leg 58L, and an upper portion of the second rear leg 58R.

As illustrated in FIG. 9, the second attachment plate 29B is positioned below the second pole portion 28b in such a manner that a plate surface of the second attachment plate 29B is oriented in the vertical direction, and the second attachment plate 29B is fixed to a lower portion of the second pole portion 28b. More specifically, a left rear portion of the second attachment plate 29B is fixed to the lower end of the second pole portion 28b by welding. The second attachment plate 29B is attached to the floor step 52. In other words, the lower portion of the second pole portion 28b is attached to the floor step 52. The floor step 52 is fixed to, for example, a member that is vertically disposed on the partition plate 47, a member that is vertically disposed on the slewing board 42, and the support bracket 18.

The handrail 26 is attached to the machine body 2 in the manner described above. However, the handrail 26 is not limited to being attached to the machine body 2. For example, a rear portion of the handrail 26 may be attached to a canopy 5 (illustrated in FIG. 4) that is attached to the upper plate 59, or a front portion of the handrail 26 may be attached to a seat base 83 (illustrated in FIG. 3) on which the operator's seat 6 is mounted.

As illustrated in FIG. 5 to FIG. 8, the handrail 26 includes a fixing unit 30 that fixes an upper portion and a front portion of the exterior cover 27 in place. The fixing unit 30 includes a plurality of fixing portions (a first fixing portion 30A, a second fixing portion 30B, a third fixing portion 30C, and a fourth fixing portion 30D). The first fixing portion 30A and the second fixing portion 30B support the upper portion of the exterior cover 27 (a cover main body 36, which will be described later), and the third fixing portion 30C and the fourth fixing portion 30D support the front portion of the exterior cover 27 (the cover main body 36).

Figure 6:
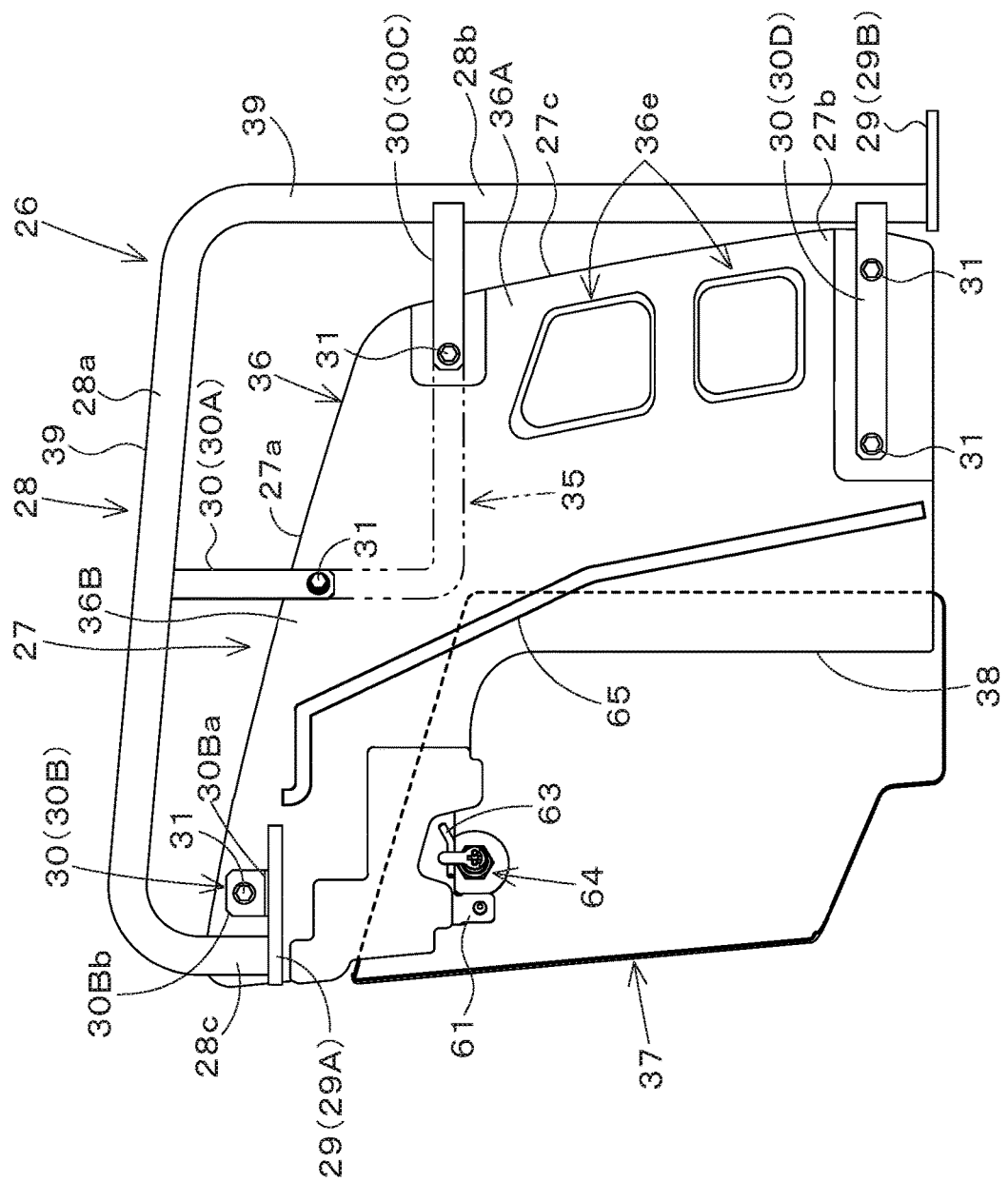
FIG. 6 is a right-hand side view of the handrail and the exterior cover.
Figure 8:
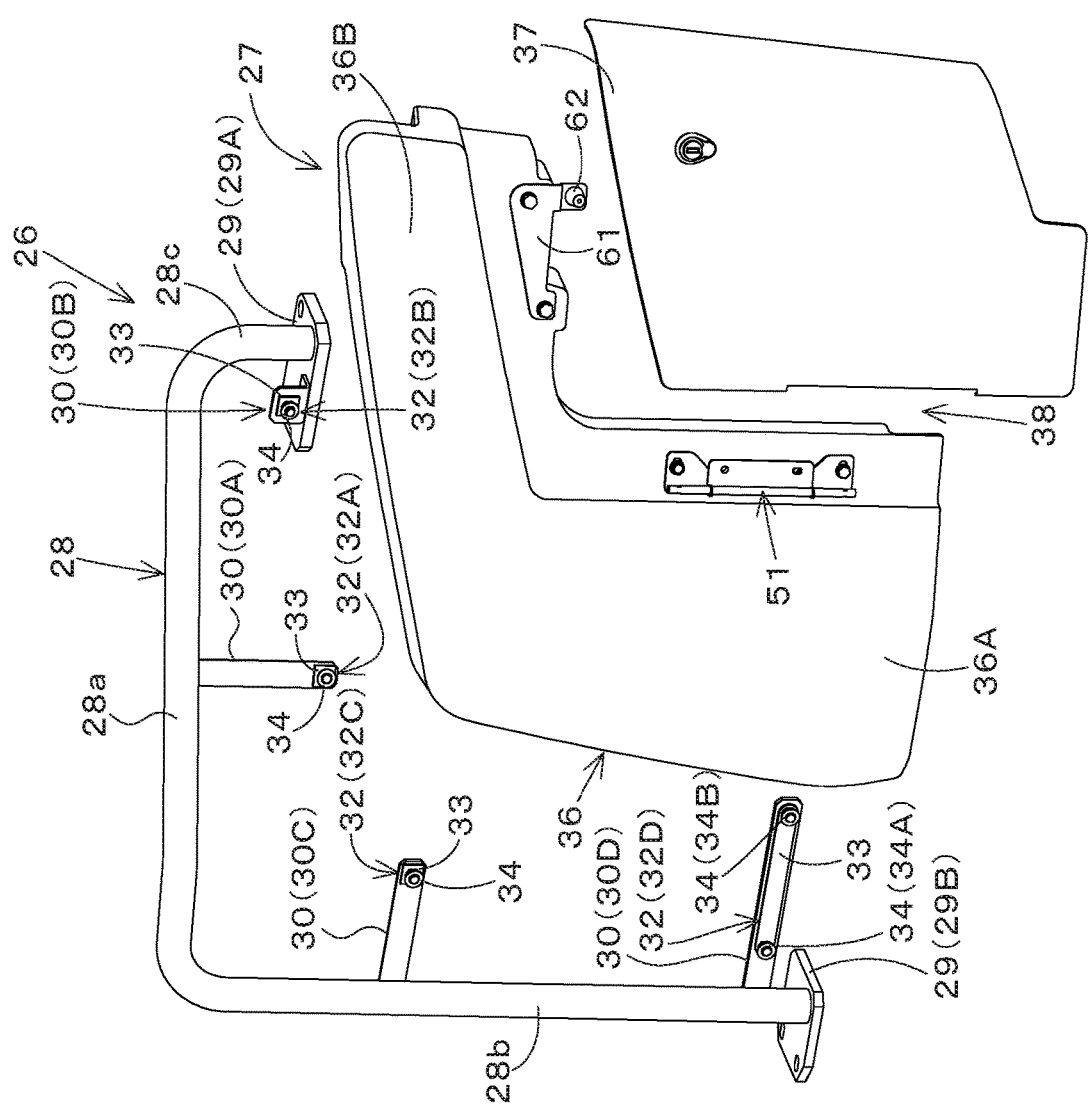
FIG. 8 is an exploded perspective view of the handrail and the exterior cover.

As illustrated in FIG. 5 and FIG. 6, the first fixing portion 30A is positioned at an intermediate portion of the first pole portion 28a and supports an intermediate portion of the upper portion of the exterior cover 27 in the longitudinal direction. More specifically, the first fixing portion 30A is formed of a plate member that is long in the vertical direction, and an upper portion of the first fixing portion 30A is fixed to the lower surface of the first pole portion 28a by welding. As illustrated in FIG. 6, a lower portion of the first fixing portion 30A is fixed to the exterior cover 27 with one of bolts (fixing members) 31. More specifically, an insert 32 (32A) that is illustrated in FIG. 8 is embedded in the exterior cover 27, and the bolt 31 extends through the first fixing portion 30A (the fixing unit 30) and is screwed into the insert 32 (32A), so that the first fixing portion 30A is attached to the exterior cover 27. In FIG. 8, for convenience of description, the inserts 32 (32A to 32D) are illustrated as being separated from the exterior cover 27 and provided on the fixing unit 30 (first to fourth fixing portions 30A to 30D).

Figure 10:
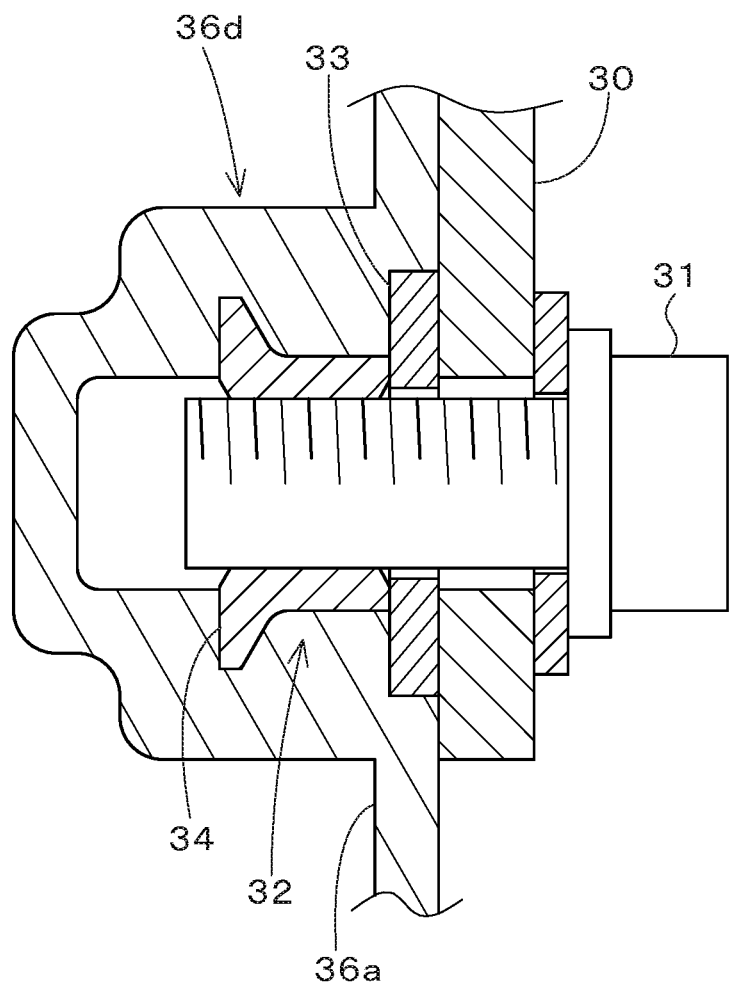
FIG. 10 is a cross-sectional view illustrating a fixing structure of a fixing unit.

As illustrated in FIG. 10, the insert 32 includes a plate member 33 and a nut member 34 fixed to the plate member 33 and is embedded in an embedding portion 36d that is formed in an inner wall 36a of the cover main body 36 (described later). The bolt 31 extends through the corresponding fixing unit 30 and the plate member 33 and is screwed into the nut member 34.

A rear portion of the first pole portion 28a is provided with the second fixing portion 30B to support the upper rear portion of the exterior cover 27. In the case illustrated in FIG. 5 to FIG. 8, the second fixing portion 30B is attached to the first attachment plate 29A. More specifically, as illustrated in FIG. 5 and FIG. 6, the second fixing portion 30B is formed of a plate member including a lower wall 30Ba that is fixed to a left front portion of the upper surface of the first attachment plate 29A by welding and a side wall 30Bb that is formed so as to extend upward from the left end of the lower wall 30Ba. The side wall 30Bb is attached to the exterior cover 27 with one of the bolts 31 (see FIG. 6) that is screwed into another insert 32 (32B), which is embedded in the exterior cover 27 and illustrated in FIG. 8.

The third fixing portion 30C is positioned at an intermediate portion of the second pole portion 28b and supports an upper front portion of the exterior cover 27. More specifically, as illustrated in FIG. 6, the third fixing portion 30C is formed of a plate member that is long in the longitudinal direction, and a front portion of the third fixing portion 30C is fixed to, by welding, a surface of an upper portion of the second pole portion 28b, the surface being oriented toward the inside of the machine body 2. A rear portion of the third fixing portion 30C is attached to the exterior cover 27 with one of the bolts 31 (see FIG. 6) that is screwed into another insert 32 (32C), which is embedded in the exterior cover 27 and illustrated in FIG. 8.

The fourth fixing portion 30D is positioned at the lower portion of the second pole portion 28b and supports a lower front portion of the exterior cover 27. More specifically, as illustrated in FIG. 6, the fourth fixing portion 30D is formed of a plate member that is long in the longitudinal direction, and a front portion of the fourth fixing portion 30D is fixed to, by welding, a surface of a lower portion of the second pole portion 28b, the surface being oriented toward the inside of the machine body 2. A rear portion of the fourth fixing portion 30D is attached to the exterior cover 27 with one of the bolts 31 (see FIG. 6) that is screwed into another insert 32 (32D), which is embedded in the exterior cover 27 and illustrated in FIG. 8. As illustrated in FIG. 8, the plate member 33 of the insert 32D that fixes the fourth fixing portion 30D in place is formed long in the longitudinal direction. The insert 32D includes a plurality of nut members 34 (a nut member 34A and a nut member 34B). The nut member 34A is fixed to a front portion of the plate member 33, and the nut member 34B is fixed to a rear portion of the plate member 33.

As illustrated in FIG. 5, FIG. 6, and FIG. 8, the exterior cover 27 includes the cover main body 36 that is formed of a member made of a resin and an opening and closing cover 37 that is formed of a sheet metal member. The cover main body 36 includes a main portion 36A and an extended portion 36B extending rearward from an upper portion of the main portion 36A. In addition, the cover main body 36 has a notch opening 38 that is formed in a lower rear portion thereof. The notch opening 38 is defined by the rear end of the main portion 36A and the lower end of the extended portion 36B and is open rearward and downward. In other words, the notch opening 38 is an opening that is formed at a position behind the main portion 36A and below the extended portion 36B.

As illustrated in FIG. 6, the cover main body 36 is fixed in place at a position above the notch opening 38 by the first fixing portion 30A and the second fixing portion 30B and fixed in place at a position in front of the notch opening 38 by the third fixing portion 30C and the fourth fixing portion 30D. Note that the first fixing portion 30A and the third fixing portion 30C may be connected to each other by a connecting portion 35.

As illustrated in FIG. 5 and FIG. 6, an upper end 27a of the exterior cover 27 (the cover main body 36) extends forward so as to be inclined downward. The first pole portion 28a is disposed so as to substantially linearly extend in the longitudinal direction when viewed from the side, and thus, the distance between the upper end 27a of the exterior cover 27 and the first pole portion 28a gradually increases toward the front. In addition, a lower end portion 27b of the exterior cover 27 (the cover main body 36) is positioned close to the second pole portion 28b, and a front end 27c of the exterior cover 27 extends upward from the lower end portion 27b so as to be inclined rearward. The second pole portion 28b is disposed so as to substantially linearly extend in the vertical direction when viewed from the side, and thus, the distance between a portion of the front end 27c of the exterior cover 27, the portion being located above the lower end portion 27b, and the second pole portion 28b gradually increases toward the upper side.

A portion of the first pole portion 28a that is located further toward the front side than the first fixing portion 30A and a portion of the second pole portion 28b that is located further toward the upper side than the third fixing portion 30C serve as a grasping portion 39 that is grasped by an operator when the operator gets on and off the working machine 1, when the machine body 2 is vibrating during, for example, traveling or working, or the like. The gap between the grasping portion 39 and the exterior cover 27 is set to be sufficient for an operator to grasp the grasping portion 39.

There may be a case where an operator holds an upper portion 40 (see FIG. 5) of the cover main body 36 that is located further toward the front side than the first fixing portion 30A when the operator gets on the working machine 1. In the present embodiment, the third fixing portion 30C is fixed to a position near the corner between the upper end 27a and the front end 27c of the exterior cover 27, and thus, the cover main body 36, which is made of a resin, can be prevented from being deformed when an operator holds and pulls the portion 40.

When an operator holds and pulls the portion 40, a force is applied to a portion of the cover main body 36 that is fixed to a rear portion of the fourth fixing portion 30D with one of the bolts 31. In the present embodiment, since the rear portion of the fourth fixing portion 30D is fixed in place, movement of the exterior cover 27, which is made of a resin, in response to an operator holding and pulling the portion 40 when getting on the working machine 1 can be restricted.

Figure 11:
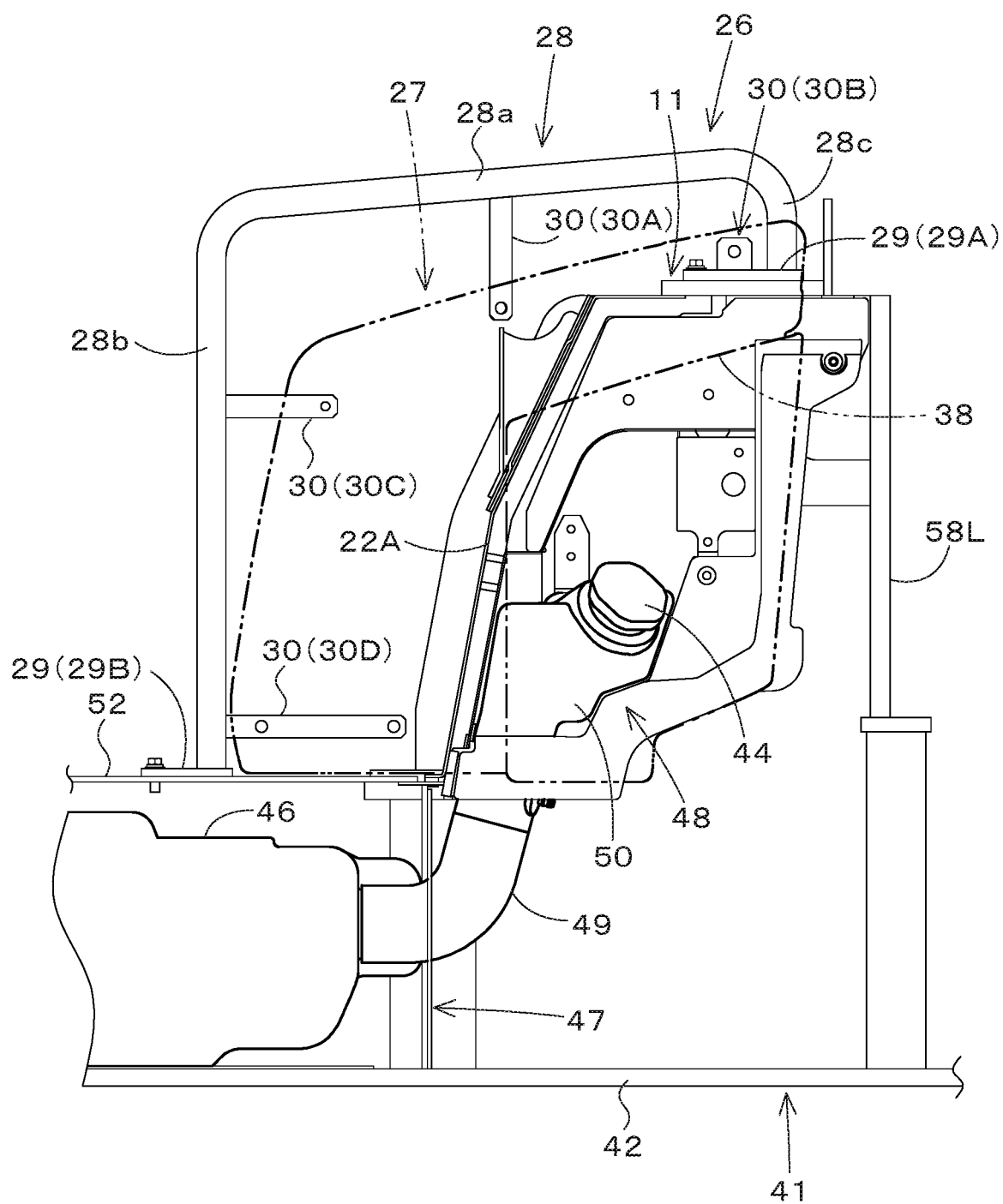
FIG. 11 is a side view illustrating a fuel tank and a refueling unit.

As illustrated in FIG. 11, the exterior cover 27 covers a refueling port 44 through which a fuel is injected into a fuel tank 46, and the notch opening 38 is formed at a position facing the refueling port 44 so as to expose the refueling port 44.

As illustrated in FIG. 11, the fuel tank 46 is installed in the machine body 2. More specifically, the fuel tank 46 is disposed at a position below the floor step 52 and in front of the partition plate 47 and mounted on the slewing board 42. The fuel tank 46 is fixed to the machine body 2 by a band, which is not illustrated in the drawings. The refueling unit 48 that is disposed in the prime mover chamber E2, which is formed behind the partition plate 47, has the refueling port 44. The refueling unit 48 is disposed at a position behind and above the fuel tank 46. In addition, the refueling unit 48 includes a subtank 50 that is capable of storing a fuel. The subtank 50 is connected to the fuel tank 46 by a connection pipe 49 that extends through the partition plate 47. The subtank 50 has the refueling port 44 and communicates with the refueling port 44. The refueling unit 48 (the refueling port 44) is positioned further toward the inside of the machine body 2 (the inner side in the machine-body width direction) than the exterior cover 27.

Figure 12:
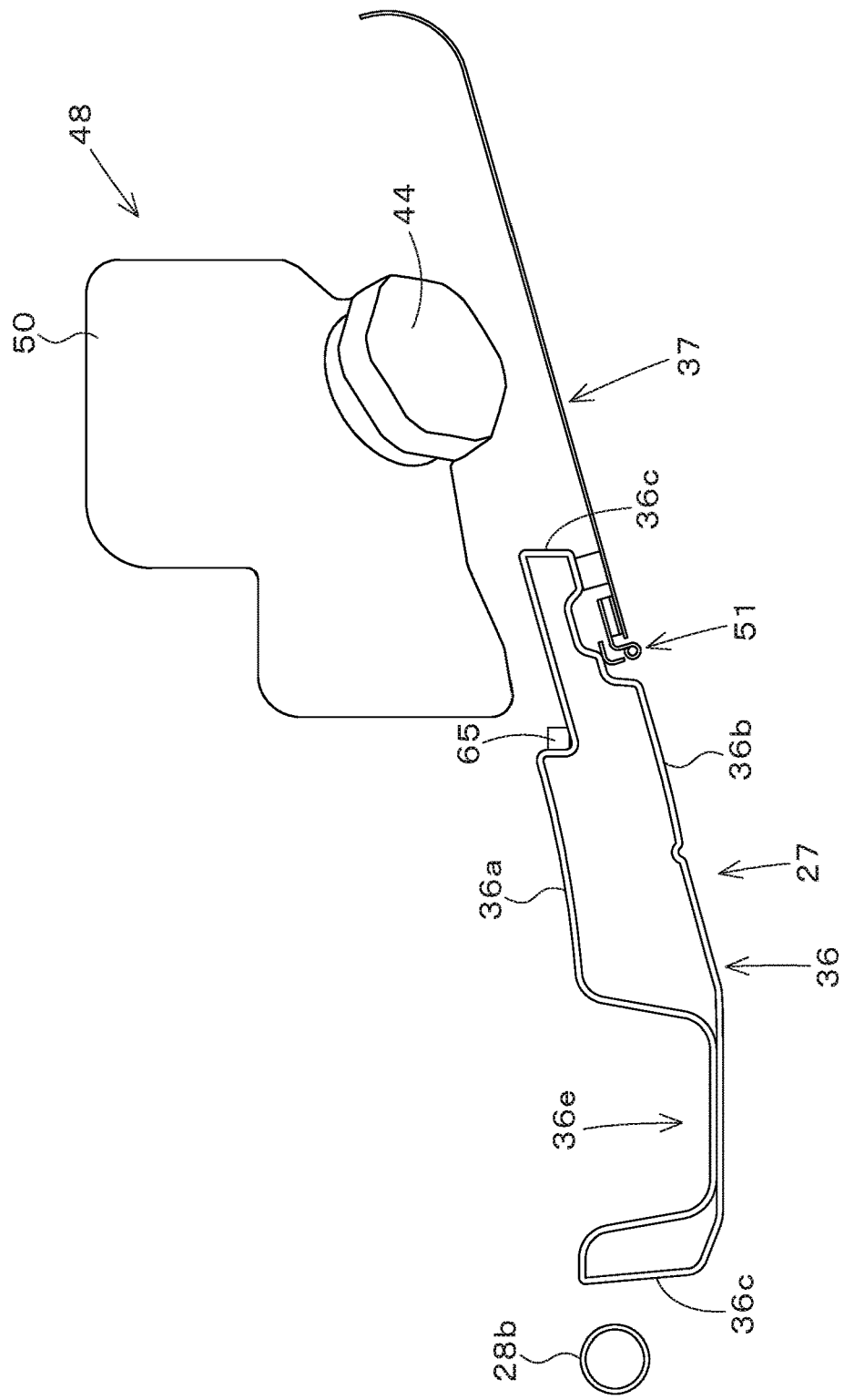
FIG. 12 is a sectional plan view of the exterior cover.

As illustrated in FIG. 12, the cover main body 36 is formed of a hollow member that is made of a resin. More specifically, the cover main body 36 has the inner wall 36a, an outer wall 36b that is positioned further toward the outside of the machine body 2 than the inner wall 36a, and connection walls 36c each of which connects an outer edge of the inner wall 36a and an outer edge of the outer wall 36b. In the present embodiment, the cover main body 36 is formed in a hollow shape by blow molding. As illustrated in FIG. 6, a front portion of the cover main body 36 between the third fixing portion 30C and the fourth fixing portion 30D has a reinforcing portion 36e (see FIG. 12) that is formed by joining the inner wall 36a and the outer wall 36b.

As illustrated in FIG. 8, a hinge 51 is attached to the outer surface of the rear portion of the main portion 36A of the cover main body 36. As illustrated in FIG. 5 and FIG. 6, the opening and closing cover 37 is disposed on the outer surface of the cover main body 36 in the machine-body width direction in such a manner as to cover the notch opening 38, and a front portion of the opening and closing cover 37 is attached to the hinge 51 such that the opening and closing cover 37 is rotatable around a vertical axis (openable and closable).

As illustrated in FIG. 8, a plate member 61 is attached to a lower portion of the extended portion 36B of the cover main body 36. A contact member 62 is attached to the plate member 61, and when the opening and closing cover 37 is in a closed state, the opening and closing cover 37 is in contact with the contact member 62. As illustrated in FIG. 6, a striker 63 is fixed to a surface of the plate member 61, the surface facing the inside of the machine body 2. A locking member 64 that locks the opening and closing cover 37 by engaging the striker 63 is attached to an upper portion of the opening and closing cover 37.

As illustrated in FIG. 6, a sealing member 65 that seals the gap between the cover main body 36 and the partition wall member 22A is disposed on a surface of the cover main body 36 that faces the inside of the machine body 2.

In the case where the exterior cover 27 is assembled to the machine body 2 without being fixed to the handrail 26, the position at which the exterior cover 27 is fixed in place is limited by the machine body 2, and it may sometimes be difficult to support the exterior cover 27. For example, when there is a portion that is desired to be protected by the exterior cover 27, or when an area that is covered with the exterior cover 27 is increased for design purpose, it may sometimes be difficult to fix the exterior cover 27 in place in a well-balanced manner as a whole. Thus, the degree of freedom regarding the size and the shape of the exterior cover 27 may sometimes be limited. In addition, since the exterior cover 27 is disposed on the upper side of the machine body 2, it is difficult to support the upper portion of the exterior cover 27. Consequently, for example, problems may sometimes occur in that the exterior cover 27 trembles due to mechanical vibration and in that an offset load is applied to the portions to which the exterior cover 27 is fixed.

In the present embodiment, the handrail 26 includes the fixing unit 30 that fixes the exterior cover 27 in place, so that the exterior cover 27 can be fixed in place in a well-balanced manner even if the exterior cover 27 has a large size. As a result, strength-related problems such as the problem in that the exterior cover 27 trembles due to mechanical vibration and the problem in that an offset load is applied to the portions to which the exterior cover 27 is fixed can be solved.

Regarding the cover main body 36 having the notch opening 38 and the exterior cover 27 including the opening and closing cover 37, which covers the notch opening 38 such that the notch opening 38 can be opened and closed, in the case where the cover main body 36 is assembled to the machine body 2 without being fixed to the handrail 26, it is difficult to perform the assembly of the cover main body 36 and to obtain a sufficient support strength.

In the present embodiment, the upper portion and the front portion of the cover main body 36 are fixed to the handrail 26, so that even the cover main body 36 having the notch opening 38 can be securely supported on the machine body 2 with a simple structure.

The exterior cover 27 is assembled to the handrail 26 and is not directly assembled to the machine body 2, and thus, in a process of manufacturing the working machine 1, the handrail 26 and the exterior cover 27 can be subassembled together and then assembled to the machine body 2. Accordingly, in a main line, it is only necessary to assemble the handrail 26 and the exterior cover 27, which have already been subassembled together, to the machine body 2, and thus, an improvement in the ease of assembly can be achieved.

Figure 13:
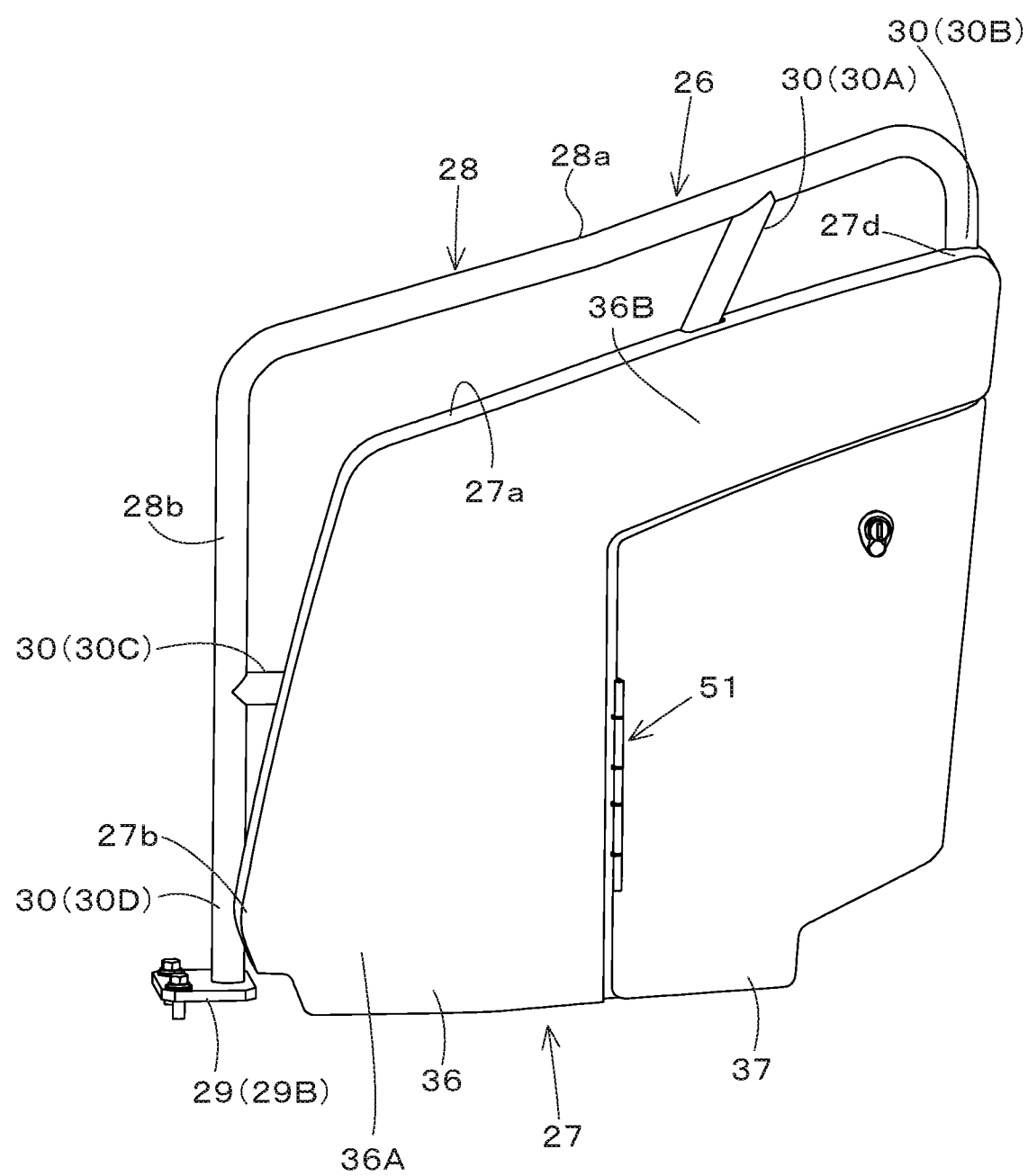
FIG. 13 is a perspective view of a handrail and an exterior cover according to another embodiment when viewed from the left-hand side.
Figure 14:
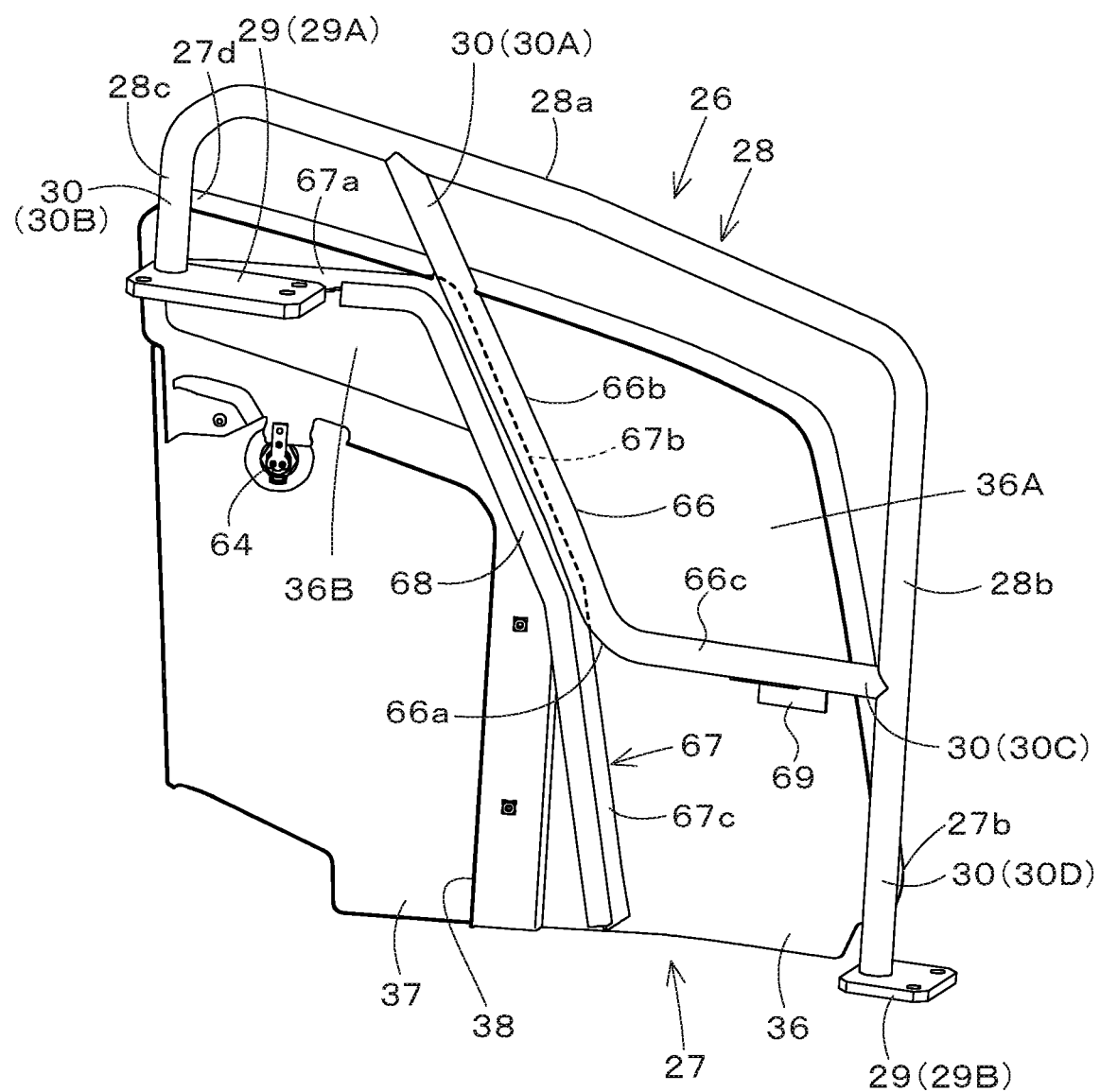
FIG. 14 is a perspective view of the handrail and the exterior cover according to the other embodiment when viewed from the right-hand side.

FIG. 13 and FIG. 14 illustrate the handrail 26 and the exterior cover 27 of another embodiment. In the following description of the other embodiment, differences from the handrail 26 and the exterior cover 27 according to the above-described embodiment illustrated in FIG. 4 to FIG. 12 will be described below.

The cover main body 36 and the opening and closing cover 37 that are included in the exterior cover 27 of the other embodiment are each formed of a sheet metal (are both press-formed products). The first pole portion 28a is formed so as to extend along the upper end of the cover main body 36.

As illustrated in FIG. 14, the first fixing portion 30A and the third fixing portion 30C are connected to each other by a connecting portion 66. The first fixing portion 30A, the third fixing portion 30C, and the connecting portion 66 are integrally formed of a bar-shaped member such as a pipe member. The connecting portion 66 is bent at a position partway along its length and includes a rear portion 66b positioned at the rear of a bent portion 66a and a front portion 66c positioned at the front of the bent portion 66a. The rear portion 66b extends upward and so as to be inclined rearward, and the front portion 66c extends forward. The first fixing portion 30A is formed so as to extend from the rear portion 66b in the direction in which the rear portion 66b extends and fixed to the first pole portion 28a and the cover main body 36 by welding. The third fixing portion 30C is formed so as to extend from the front portion 66c in the direction in which the front portion 66c extends and fixed to the second pole portion 28b and the cover main body 36 by welding.

As illustrated in FIG. 14, a plate member 67 is fixed to the surface of the cover main body 36, the surface facing the inside of the machine body 2, by welding. The plate member 67 is formed of a tie plate member and includes a first portion 67a, a second portion 67b, and a third portion 67c. The first portion 67a extends from the upper rear portion of the cover main body 36 toward the upper end of the rear portion 66b. The second portion 67b is formed so as to obliquely extend along the rear portion 66b. The rear portion 66b of the connecting portion 66 is fixed to the second portion 67b by welding. The third portion 67c extends forward from the lower end of the second portion 67b so as to be inclined downward. A sealing member 68 that seals the gap between the cover main body 36 and the partition wall member 22A is fitted on an edge of the plate member 67, the edge facing the inside of the machine body 2. A support stay 69 is fixed to a surface of the front portion of the cover main body 36, the surface facing the inside of the machine body 2, by welding. The support stay 69 is disposed below the front portion 66c of the connecting portion 66. The front portion 66c is fixed to the support stay 69 by welding.

As illustrated in FIG. 13 and FIG. 14, an intermediate portion of the third pole portion 28c is fixed to an upper rear end portion 27d of the cover main body 36 by welding. In the present embodiment, the intermediate portion of the third pole portion 28c forms the second fixing portion 30B. A lower portion of the second pole portion 28b is fixed to the lower end portion 27b of the cover main body 36 by welding. In the present embodiment, the lower portion of the second pole portion 28b forms the fourth fixing portion 30D, which is included in the fixing unit 30.

In the case where the exterior cover 27 (the cover main body 36) is a press-formed product, the exterior cover 27 can be fixed to the handrail 26 by welding, and thus, as in the embodiment illustrated in FIG. 1 to FIG. 12, it is not necessary to subassemble the exterior cover 27 to the handrail 26.

Note that, in the present embodiment, the configuration has been described in which the exterior cover 27 is fixed to the fixing unit 30 of the handrail 26 and is not fixed to the machine body 2. However, the present invention is not limited to this configuration, and a portion of the exterior cover 27 may be fixed to the machine body 2 in addition to the fixing unit 30 of the handrail 26.

The working machine 1 of the present embodiment includes the machine body 2, the operator's seat 6 mounted on the machine body 2, the exterior cover 27 positioned on the side of the operator's seat 6, and the handrail 26 positioned with the exterior cover 27 on the same side of the operator's seat 6 and attached to the machine body 2. The exterior cover 27 is fixed to the fixing unit 30 of the handrail 26.

According to this configuration, the exterior cover 27 can be securely fixed in place by fixing the exterior cover 27 to the handrail 26.

In addition, the passage 12 to be used by an operator who gets on and off the operator's seat 6 is formed in front of the handrail 26 and the exterior cover 27, and the handrail 26 is located at a position where an operator can grasp it when the operator gets on and off.

According to this configuration, the handrail 26 is a member that is grasped by an operator when the operator gets on and off, and thus, the exterior cover 27 can be securely supported.

The exterior cover 27 is fixed to the handrail 26 and is not fixed to the machine body 2.

According to this configuration, the exterior cover 27 can be attached to the machine body 2 together with the handrail 26.

The handrail 26 includes the first pole portion 28a that extends above the exterior cover 27 in a direction from the front of the exterior cover 27 toward the rear of the exterior cover 27 and the second pole portion 28b that is positioned in front of the exterior cover 27 and that extends downward from the front portion of the first pole portion 28a.

The fixing unit 30 includes the plurality of fixing portions (the first fixing portion 30A, the second fixing portion 30B, the third fixing portion 30C, and the fourth fixing portion 30D) that are located on sides thereof facing the first pole portion 28a and the second pole portion 28b and that support the upper portion and the front portion of the exterior cover 27.

According to this configuration, the exterior cover 27 can be securely fixed in place in a well-balanced manner even if the exterior cover 27 has a large size.

The hood 22 covers the prime mover E1 mounted on the rear portion of the machine body 2, the support frame 11 is erected on the machine body 2 and supports the hood 22, and the floor step 52 defines the floor surface of the machine body 2. The rear portion of the first pole portion 28a is attached to the support frame 11, and the lower portion of the second pole portion 28b is attached to the floor step 52.

According to this configuration, the handrail 26 can be securely attached to the machine body 2.

The plurality of fixing portions include the first fixing portion 30A on the intermediate portion of the first pole portion 28a, the second fixing portion 30B on the rear portion of the first pole portion 28a, the third fixing portion 30C on the intermediate portion of the second pole portion 28b, and the fourth fixing portion 30D on the lower portion of the second pole portion 28b. The first fixing portion 30A and the second fixing portion 30B support the upper portion of the exterior cover 27, and the third fixing portion 30C and the fourth fixing portion 30D support the front portion of the exterior cover 27.

According to this configuration, the upper portion and the front portion of the exterior cover 27 can be fixed to the handrail 26 in a well-balanced manner.

The exterior cover 27 includes the cover main body 36 including the main portion 36A and the extended portion 36B extending rearward from the upper portion of the main portion 36A and the opening and closing cover 37 covering the notch opening 38, which is formed in the cover main body 36 at a position behind the main portion 36A and below the extended portion 36B, such that the notch opening 38 can be opened and closed. The fixing unit 30 fixes the upper portion of the cover main body 36 in place above the notch opening 38 and fixes the front portion of the cover main body 36 in place in front of the notch opening 38.

According to this configuration, even the exterior cover 27 that includes the cover main body 36 having the notch opening 38 and the opening and closing cover 37 covering the notch opening 38 such that the notch opening 38 can be opened and closed can be securely assembled to the machine body 2.

The cover main body 36 is formed of a hollow member made of a resin and detachably fixed to the fixing unit 30 with the fixing members (the bolts 31).

According to this configuration, the cover main body 36 can be made of a resin at a low cost, and the strength of the exterior cover 27, which is made of a resin, can also be ensured. In addition, the exterior cover 27 can be removed from the handrail 26 and replaced.

The cover main body 36 is formed of a sheet metal member and fixed to the fixing unit 30 by welding.

According to this configuration, the exterior cover 27 and the handrail 26 can be easily assembled to the machine body 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine, comprising:
   a machine body;
   an operator's seat mounted on the machine body;
   an exterior cover positioned on a side of the operator's seat; and
   a handrail positioned with the exterior cover on the same side of the operator's seat and attached to the machine body, wherein
   the exterior cover is fixed to a fixing unit included in the handrail,
   the handrail includes a first pole portion that extends above the exterior cover in a direction from a front of the exterior cover toward a rear of the exterior cover and a second pole portion that is positioned in front of the exterior cover and that extends downward from a front portion of the first pole portion, and
   the fixing unit includes a plurality of fixing portions provided on the first pole portion and on the second pole portion to support an upper portion of the exterior cover and a front portion of the exterior cover.

2. The working machine according to claim 1, wherein
   a passage to be used by an operator who gets on and off the operator's seat is formed in front of the handrail and the exterior cover, and the handrail is located at a position at which the operator can grasp the handrail when the operator gets on and off.

3. The working machine according to claim 1, wherein the exterior cover is fixed to the handrail and is not fixed to the machine body.

4. The working machine according to claim 1, further comprising:
   a hood to cover a prime mover mounted on a rear portion of the machine body;
   a support frame erected on the machine body to support the hood; and
   a floor step defining a floor surface of the machine body, wherein
   a rear portion of the first pole portion is attached to the support frame, and
   a lower portion of the second pole portion is attached to the floor step.

5. The working machine according to claim 1, wherein the plurality of fixing portions include
   a first fixing portion on an intermediate portion of the first pole portion,
   a second fixing portion on a rear portion of the first pole portion,
   a third fixing portion on an intermediate portion of the second pole portion, and
   a fourth fixing portion on a lower portion of the second pole portion,
   the first fixing portion and the second fixing portion support the upper portion of the exterior cover, and
   the third fixing portion and the fourth fixing portion support the front portion of the exterior cover.

6. A working machine, comprising:
a machine body;
an operator's seat mounted on the machine body;
an exterior cover positioned on a side of the operator's seat; and
a handrail positioned with the exterior cover on the same side of the operator's seat and attached to the machine body, wherein
the exterior cover is fixed to a fixing unit included in the handrail, the exterior cover including includes
a cover main body including a main portion and an extended portion that extends rearward from an upper portion of the main portion and
an opening and closing cover that covers a notch opening, which is formed in the cover main body at a position behind the main portion and below the extended portion, such that the notch opening can be opened and closed, and
the fixing unit fixes an upper portion of the cover main body in place above the notch opening and fixes a front portion of the cover main body in place in front of the notch opening.

7. The working machine according to claim 6, wherein the cover main body is formed of a hollow member made of a resin and detachably fixed to the fixing unit with a fixing member.

8. The working machine according to claim 6, wherein the cover main body is formed of a sheet metal member and fixed to the fixing unit by welding.

\* \* \* \* \*